United States Patent
Dudar et al.

(10) Patent No.: US 12,238,818 B2
(45) Date of Patent: Feb. 25, 2025

(54) PLMN ROAMING FOR PRIVATE NETWORK SUBSCRIBERS

(71) Applicant: Verizon Patent and Licensing Inc., Basking Ridge, NJ (US)

(72) Inventors: Zoltan Janos Dudar, Roswell, GA (US); Subbarao Yallapragada, San Diego, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 430 days.

(21) Appl. No.: 17/694,954

(22) Filed: Mar. 15, 2022

(65) Prior Publication Data

US 2023/0300595 A1    Sep. 21, 2023

(51) Int. Cl.
*H04W 8/02*        (2009.01)

(52) U.S. Cl.
CPC ..................................... *H04W 8/02* (2013.01)

(58) Field of Classification Search
None
See application file for complete search history.

(56) References Cited

U.S. PATENT DOCUMENTS

| | | | |
|---|---|---|---|
| 2013/0242754 A1* | 9/2013 | Shaikh | H04W 24/04 370/242 |
| 2021/0297844 A1* | 9/2021 | Prabhakar | H04W 8/12 |
| 2022/0141641 A1* | 5/2022 | Ramprasad | H04W 36/30 370/329 |

* cited by examiner

*Primary Examiner* — Adolf Dsouza (57) ABSTRACT

Systems and methods described herein enable private telecommunications network subscribers that do not have a distinctive Public Land Mobile Network (PLMN) ID to access visited PLMN services. A device in a visited wireless network receives an attach request for a user equipment (UE) device; detects, based on the attach request, that the UE device is subscribed to a private network; provides, to a roaming identity register (RIR), a roaming authorization request for the UE device; receives a roaming authorization response that includes a network pointer to the private network; and applies, based on the roaming authorization response, a roaming policy for the UE device.

20 Claims, 9 Drawing Sheets

PLMN ROAMING FOR PRIVATE NETWORK SUBSCRIBERS

BACKGROUND INFORMATION

Public Land Mobile Networks (PLMNs) are traditionally designed to support mobile devices over an extensive geographic area (e.g., national or regional coverage). Private mobile networks, by contrast, may use similar wireless technologies but may be constrained to a smaller geographic area. Private mobile networks may be used for a variety of reasons, such as to assure better local coverage, low latency, privacy, security, or flexibility to launch specific services. For private mobile network subscribers, there may be a need to fall back to a PLMN wherever the private network coverage is not available.

DETAILED DESCRIPTION OF EXAMPLE EMBODIMENTS

The following detailed description refers to the accompanying drawings. The same reference numbers in different drawings may identify the same or similar elements.

A Public Land Mobile Network (PLMN) operator may offer inbound roaming to private network subscribers in a manner similar to national (or international) roaming. In the case of national (or international) roaming, the PLMN operator allows the subscribers of third party networks to utilize the PLMN operator's network and network services based on a policy that is established per PLMN identifier (ID). A PLMN ID includes codes (e.g. a Mobile Country Code (MCC) and a Mobile Network Code (MNC)) that uniquely identify the third party network and its subscribers. National and international roaming requires the PLMN operator to sign a roaming agreement with the third party network prior to the roaming. It also assumes that all the third party network subscribers will receive similar treatment and services based on their unique PLMN ID (MCC+MNC).

Typically, roaming agreements are configured on the visited network in terms of allowed PLMNs associated with authorized roaming partners. A mobility management entity (MME) or Access and Mobility Management Function (AMF) in a PLMN typically performs a gatekeeping function via a roaming database that helps the MME/AMF cross check which roaming subscribing devices to let through using the service provider PLMN ID that is broadcast using an over the air interface. However, in the case of private networks there may not be a unique PLMN ID reserved for the private network, as the MNC is 3 digits and only permits 1000 codes per country. Private networks, therefore, are typically assigned an MCC of 999 and a MNC of 99 or 999. Thus, there is no globally unique PLMN ID (MCC+MNC) for the private network subscribers to support roaming.

Systems and methods described herein provide a roaming service for private network subscribers. Private telecommunications network subscribers that do not have a unique (i.e., private network specific) PLMN ID, and would otherwise be constrained to their individual private networks, are able to utilize PLMN services by roaming into a visited PLMN. According to an implementation, instead of the PLMN ID, the International Mobile Subscriber Identity (IMSI) digits beyond the leading MCC+MNC of the roaming subscriber can be analyzed by the visited PLMN to decide if roaming is allowed and, if allowed, what policies the visited PLMN shall apply to each individual roaming subscriber. Additional network functions for the visited PLMN are able to look up and map the IMSI (or part of the IMSI) to a unique pointer to the private network and then correctly route the signaling from the visited PLMN into the private network (which may act as a "home PLMN" for roaming) so that the roaming is made possible for the private network subscribers in the absence of a unique PLMN ID.

Figure 1:
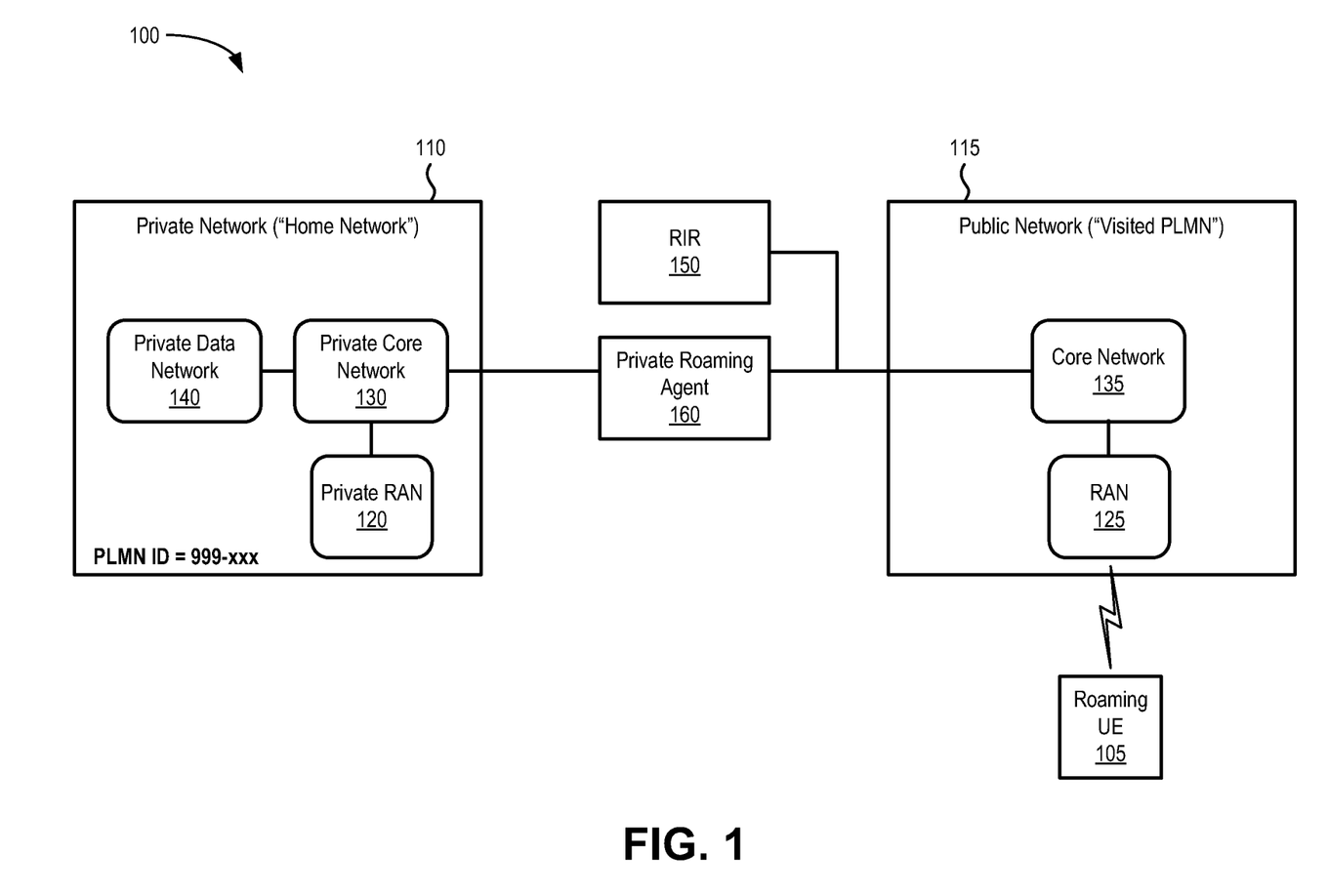
FIG. 1 illustrates an example network in which the systems and methods described herein may be implemented.

FIG. 1 is simplified diagram of a network environment 100 in which systems and methods described herein may be implemented. As shown in FIG. 1, network environment 100 may include a user equipment device (UE) 105, private network 110, and a public network 115. Network environment 100 may also include a roaming identity register (RIR) 150 and a private roaming agent (PRA) 160.

UE 105 may include a mobile device (such as a smart phone) that is registered with private network 110. UE 105 may include a Subscriber Identity Module (SIM). A SIM may include, for example, an embedded SIM (eSIM), a Universal Integrated Circuit Card (UICC), or embedded UICC (eUICC). The SIM may store a user's (or a subscriber's) credentials associated with accessing private network 110. Furthermore, to enable UE 105 to receive services from other networks (e.g., public network 115) when outside the coverage area of private network 110, the SIM may also include additional information, such as a PLMN ID for private network 110 and an IMSI (or Subscription Permanent Identifier (SUPI)) for UE 105.

Private network 110 may include a private wireless network that includes a private radio access network (RAN) 120, a private core network 130, and a private data network 140. For example, private network 110 may be associated with an enterprise or corporate entity. RAN 120 may allow UE 105 to access core network 130. To do so, RAN 120 may establish and maintain, with participation from UE 105, an over-the-air channel with UE 105; and maintain backhaul channels (not shown) with core network 130. RAN 120 may convey information through these channels, from UE 105 to core network 130 and vice versa.

RAN 120 may include an LTE radio network, a Next Generation (NG) radio access network (e.g., Fifth Generation (5G) radio access network) and/or another advanced radio network. These radio networks may operate in many different frequency ranges, including millimeter wave (mmWave) frequencies, sub 6 GHz frequencies, and/or other frequencies. RAN 120 may include multiple wireless stations, Central Units (CUs), Distributed Units (DUs), Radio Units (RUs), and/or Integrated Access and Backhaul (IAB) nodes. The wireless station, CUs, DUs, RUs, and/or IAB nodes may establish and maintain over-the-air channels with UEs 105 and backhaul channels with core network 130.

Core network 130 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, an intranet, a PLMN, or a combination of networks. Core network 130 may allow the delivery of Internet Protocol (IP) services to UE 105 and may interface with other networks, such as data network 140.

Depending on the implementation, core network 130 may include 4G core network components (e.g., a Serving Gateway (SGW), a Packet data network Gateway (PGW), a Mobility Management Entity (MME), a Home Subscriber Server (HSS), an Authentication Authorization and Accounting (AAA) server, a Policy and Charging Rules Function (PCRF), etc.). A SGW may provide an access point to a UE device, handle forwarding of data packets, perform transport level markings, and act as a local anchor point during handover procedures. A PGW may function as a gateway to a data network (e.g., private data network 140). An MME may provide control plane processing for the 4G core. An HSS may store information associated with UE 105 and/or information associated with users of UE 105. An AAA server may include user profiles, scripts, and/or programs for authentication procedures. A PCRF may support policies to control network behavior, provide policy rules to control plane functions, access subscription information relevant to policy decisions, make policy decisions, and/or perform other types of processes associated with policy enforcement.

In other implementations, core network 130 may include 5G core network components (e.g., a Unified Data Management (UDM) function, an Access and Mobility Management Function (AMF), a user plane function (UPF), a session management function (SMF), an Authentication Server Function (AUSF), and a Unified Data Repository (UDR), and a policy control function (PCF) etc.). A UDM may maintain subscription information for UE devices, manage subscriptions, perform access authorization based on subscription data, and/or perform other processes associated with managing user data. An AMF may perform registration management, connection management, reachability management, mobility management, lawful intercepts, access authentication and authorization, positioning services management, management of non-3GPP access networks, and/or other types of management processes. A UPF may perform packet routing and forwarding, perform the user plane part of policy rule enforcement, perform traffic usage reporting, perform QoS handling in the user plane, and/or perform other types of user plane processes. An SMF may perform session establishment, session modification, and/or session release, perform selection and control of a UPF, and/or perform other types of control plane processes for managing user plane data. An AUSF may perform authentication procedures. A PCF may determine how a certain data flow shall be treated, and may ensure that traffic mapping and treatment is in accordance with a user's subscription profile.

Core network 130 may also include other 4G and/or 5G core network components, including combined 4G/5G network components, such as a UDM+HSS, a SMF+PGW-C, a UPF+PGW-U, and a PCF+PCRF. The combined network components may combine and/or segregate functionalities of corresponding individual 4G and 5G components described above.

Data network 140 may include one or more networks that are external to core network 130. In some implementations, data network 140 may include packet data networks, such as an Internet Protocol (IP) network. In another implementation, data network 140 may be part of core network 130. Data network 140 may provide particular network services, such as, for example, Voice-over-IP (VoIP) services, messaging services, video services, etc.

Public network 115 (also referred to herein as "visited PLMN 115") may include a PLMN associated with a mobile network operator (MNO). Public network 115 may include a public RAN 125 and a public core network 135. Public RAN 125 and a public core network 135 may include components similar to those described above in connection with private RAN 120 and a private core network 130. Public network 115 may include additional components that are not shown in FIG. 1 for simplicity.

RIR 150 may include one or more network devices, functions, applications, and/or databases that allows for the mapping of IMSI/SUPIs (without unique PLMN IDs) to roaming policies and private network domains to route subsequent signaling between visited networks (e.g., public network 115) and home networks (e.g., private network 110). RIR 150 may reside inside the visited PLMN or outside the visited PLMN. If RIR 150 is outside of the visited PLMN (as shown in FIG. 1), RIR 150 may be centralized to serve multiple PLMNs (e.g., PLMNs serviced by different MNOs).

RIR 150 may be provisioned, for example, as a result of a roaming agreement between an operator of private network 110 and a MNO for public network 115. RIR 150 may store records for subscribers from multiple private networks. RIR 150 may store the IMSIs (or SUPIs) for each enabled private network subscriber (e.g., associated with a UE 105). In the RIR database, the records of IMSIs are mapped to Private Network Pointers that help route the private-network-bound signaling correctly from the visited PLMN. A Private Network Pointer can be a unique string (e.g., a sequence of alpha-numeric characters), a network address of an HSS or UDM in the private networks, an application ID, a Destination-Realm or a fully-qualified domain name (FQDN), for example, that can be analyzed for the purpose of roaming policy-setting and for routing by components of the visited PLMN (e.g., an MME or an AMF). For example, the Private Network Pointer may enable components in core network 135 to identify a previously provisioned roaming policy for subscribers of private network 110. The actual routing may then optionally be carried out by Private Roaming Agent 160 (e.g., a proxy function), described below.

RIR 150 may guarantee that the IMSI is unique within its jurisdiction. For example, RIR 160 may further divide the IMSI beyond the MCC to, for example, IMSI=MCC (3 digits)+MNC (6 digits)+Subscriber ID (7 digits). With this extended MNC (from 3 to 6 digits, for example), RIR 150 may also allow the visited PLMN 115 to set roaming policies for a group of subscribers (with the same extended MNC) rather than requiring separate policy for each individual IMSI.

Private roaming agent (PRA) 160 may include one or more network devices, computing devices, or network functions. PRA 160 may help the visited core network (e.g., core network 135) to route the signaling (e.g., diameter protocol or 5G service architecture related HTTP2) to the correct home core network (e.g., private core network 130). Private roaming agent 160 may be implemented, for example, as an extension to the Diameter Edge Agent (DEA) that has knowledge of the routing details to the private network (e.g., a Realm Routing Table) or as an extension to the Security Edge Protection Proxy (SEPP) based on prior provisioning. Private roaming agent 160 may reside in the visited PLMN or outside of the visited PLMN. In other implementations, PRA 160 may be omitted in network environment 100, and components of core network 135 may be configured to communicate directly with components of private core network 130 to facilitate roaming based on information from RIR 150.

In the configuration for FIG. 1, assume UE 105 is outside the coverage area of private network 110 and attempts to attach to visited PLMN 115. An MME or AMF in core network 135 of visited PLMN 115 may be configured to contact RIR 150 if a UE 105 from a private network (e.g., with an MCC=999) attempts to attach to RAN 125 for the purpose of inbound roaming. Based on previous provisioning, RIR 150 may help the visited core network 135 verify if UE 105 is allowed to roam by returning a unique pointer (e.g., Private Network Pointer) to the private network (e.g., private network 110) associated with UE 105 in the absence of a unique MCC+MNC. RIR 150 may also supply additional details to help visited core network 135 route the PLMN-Private Network signaling, if needed. In addition to the pointer, RIR 150 may return an attribute that allows the MME (or AMF) to understand routing preferences pre-provisioned for the private network subscriber in the RIR, to select a particular PRA and to pass this attribute to this PRA to allow, for example, least cost routing.

Figure 2:
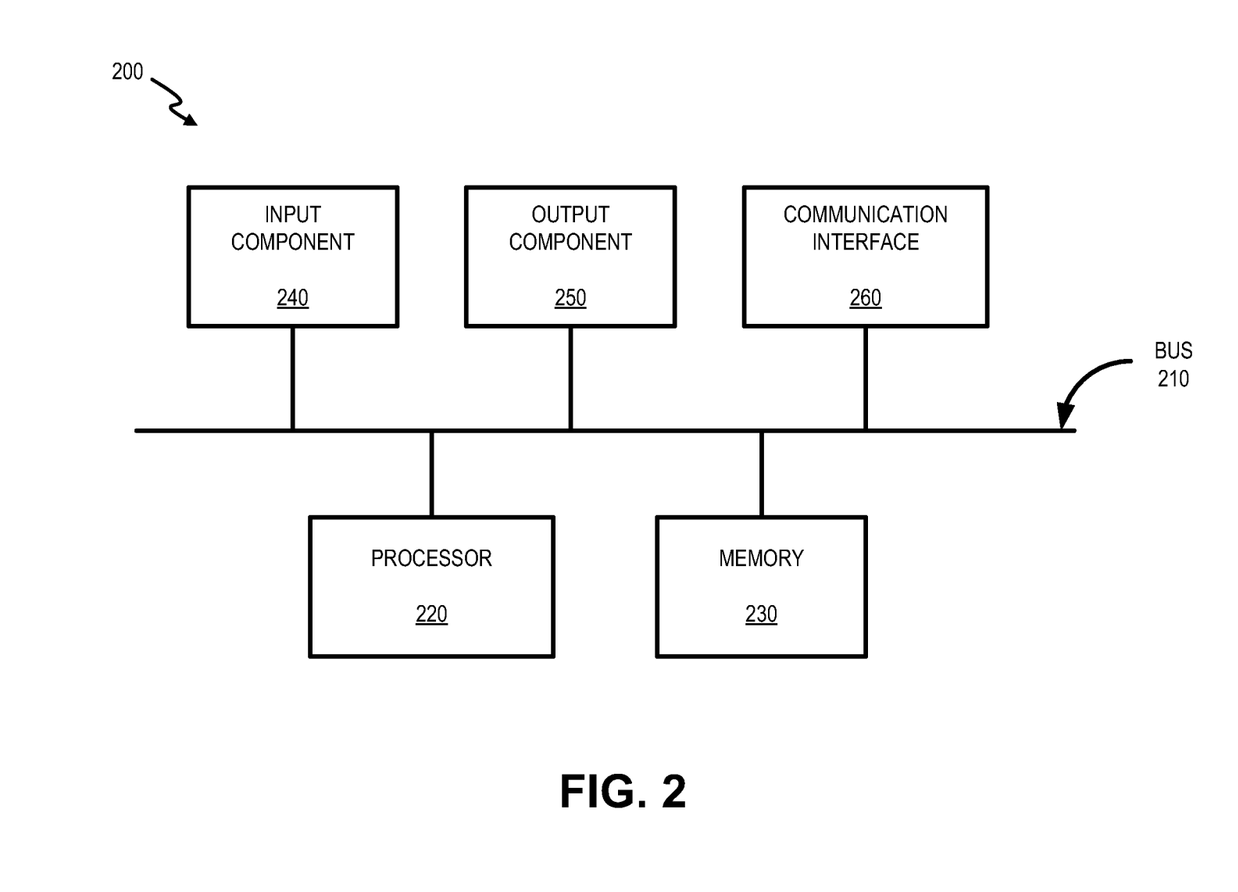
FIG. 2 depicts example components of a network device, according to an implementation.

FIG. 2 is a diagram illustrating exemplary components of a device 200. Device 200 may correspond to or include, for example, UE 105, RIR 150, PRA 160, or another component of network environment 100. Alternatively or additionally, UE 105, RIR 150, PRA 160, or the others components of network environment 100 may include one or more devices 200 and/or one or more components of device 200.

Device 200 may include a bus 210, a processor 220, a memory 230, an input component 240, an output component 250, and a communication interface 260. Although FIG. 2 shows exemplary components of device 200, in other implementations, device 200 may contain fewer components, additional components, different components, or differently arranged components than those depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220. Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. For example, communication interface 260 may include one or more antennas to transmit and/or receive RF signals over the air. Communication interface 260 may, for example, receive RF signals and transmit them over the air to UE 105/RAN 125, and receive RF signals over the air from RAN 125/UE 105. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hard-wired circuitry may be used in place of or in combination with software instructions to implement processes described herein. Thus, implementations described herein are not limited to any specific combination of hardware circuitry and software.

Figure 3:
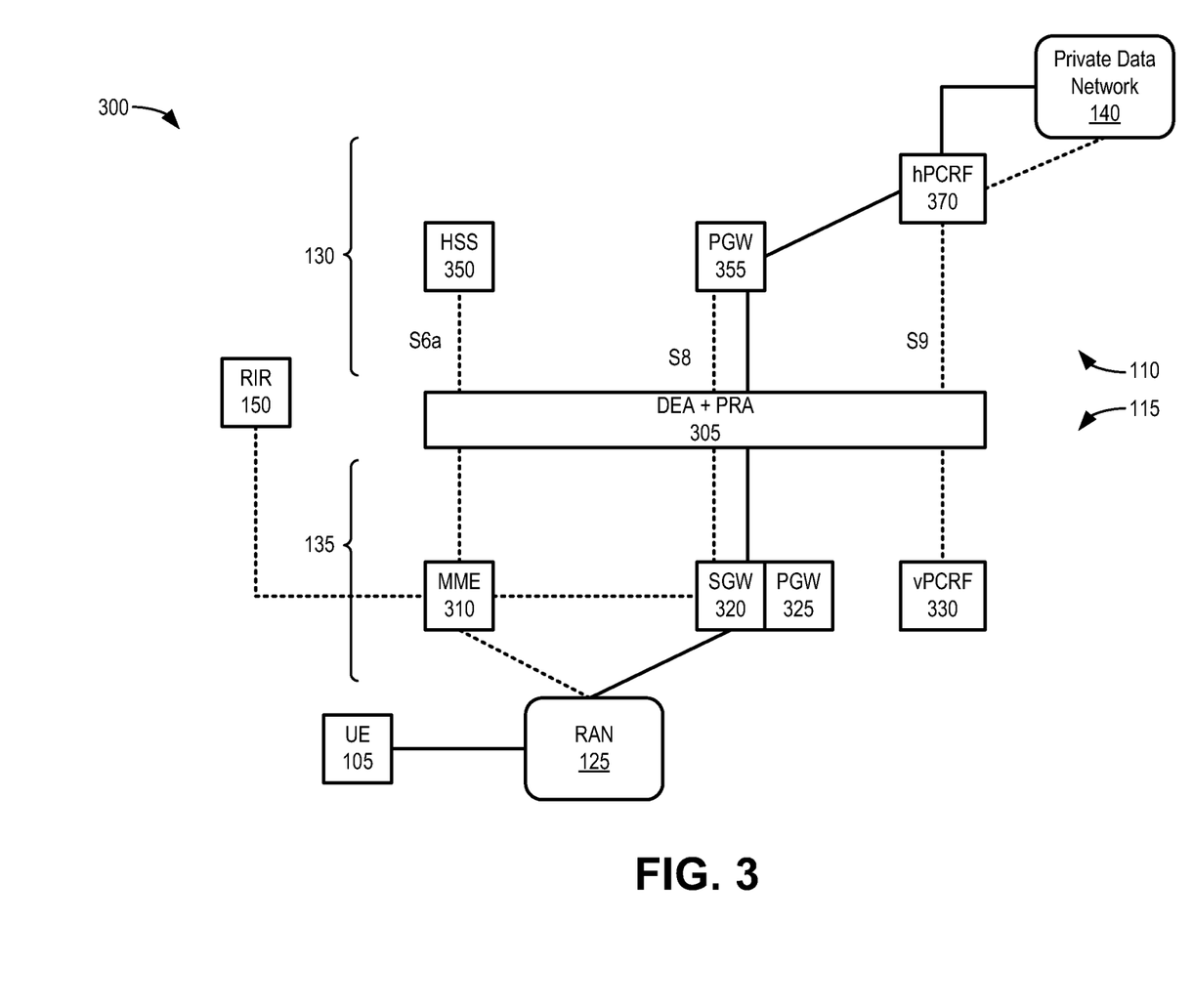
FIG. 3 is a diagram illustrating an embodiment of a roaming service for private network subscribers in a Long Term Evolution (LTE) network environment, according to an implementation.

FIG. 3 is a diagram illustrating an embodiment of the roaming service for private network subscribers for an LTE network environment 300, according to an implementation. As illustrated in FIG. 3, network environment 300 may include core network 130 and private data network 140 of private network 110, RAN 125 and core network 135 of visited PLMN 115, RIR 150, and a combined DEA+PRA 305. In the configuration of FIG. 3, private network 110 and visited PLMN 115 may include 4G LTE network components. RAN 125 may include an E-UTRAN for a 4G network. Core network 135 may include an MME 310, a SGW 320, a visited PGW (vPGW) 325, and a visited PCRF (vPCRF) 330. Core network 130 may include an HSS 350, a home PGW (hPGW) 355, and a home PCRF (hPCRF) 370.

In the configuration of FIG. 3, DEA+PRA 305 may implement private roaming agent 160 as an extension to a DEA that has knowledge of the routing details to private network 110 (e.g., a Realm Routing Table). DEA+PRA 305 may route diameter signaling over S6a, S8, and S9 interfaces between visited PLMN 115 and home network 110. Although shown within visited PLMN 115 in FIG. 3, in other implementations, RIR 150 and/or DEA+PRA 305 may also reside outside visited PLMN 115.

Figure 4:
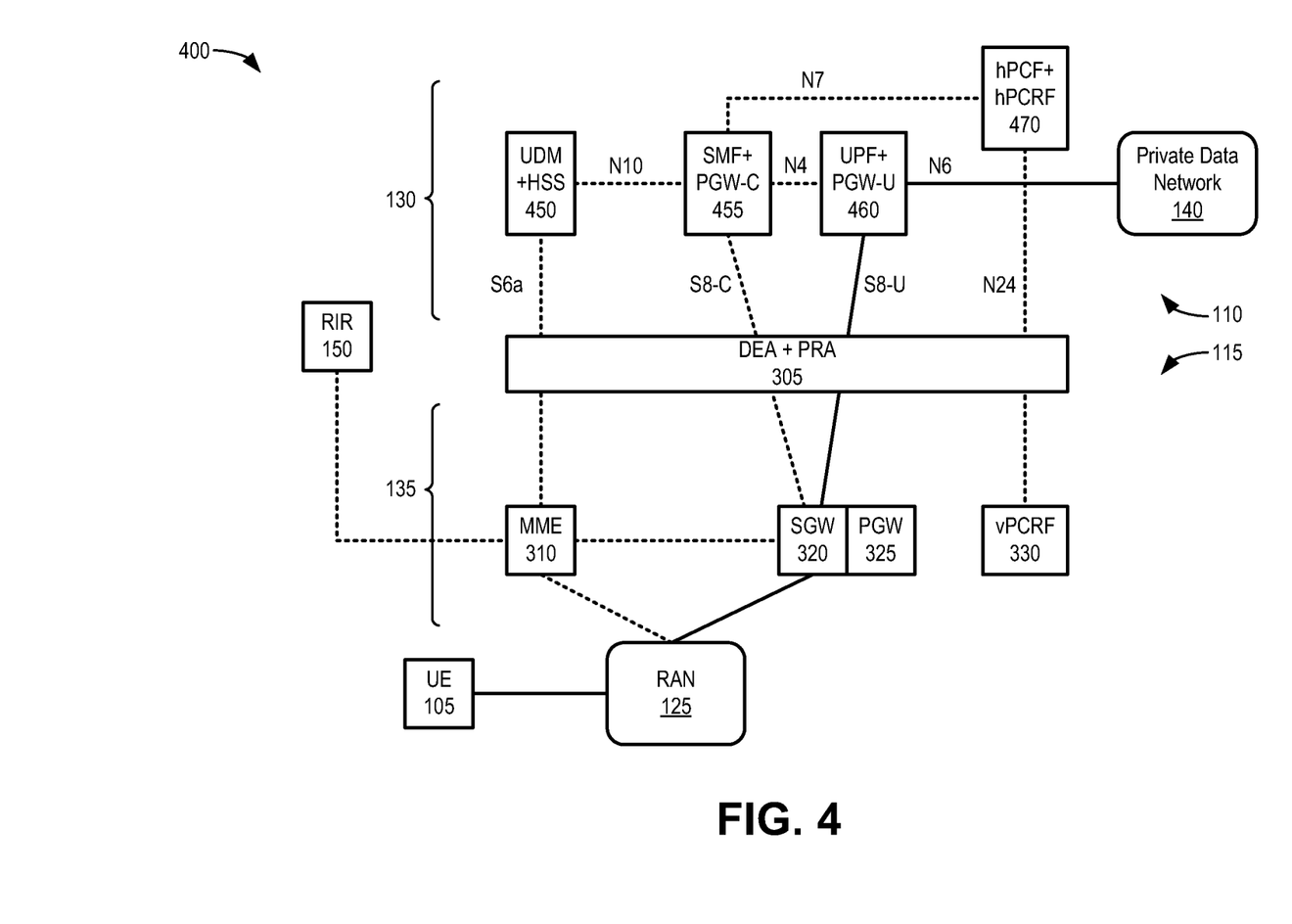
FIG. 4 is a diagram illustrating an embodiment of the roaming service for a network environment with an LTE visited network and a Fifth Generation (5G) private network, according to an implementation.

FIG. 4 is a diagram illustrating an embodiment of the roaming service for private network subscribers for a network environment 400 with a 4G visited PLMN and a 5G private network, according to an implementation. As illustrated in FIG. 4, network environment 400 may include core network 130 and private data network 140 of private network 110, RAN 125 and core network 135 of visited PLMN 115, RIR 150, and combined DEA+PRA 305. In the configuration of FIG. 4, private network 110 may include 4G LTE network components, and visited PLMN 115 may include non-standalone 5G components. RAN 125 may include an E-UTRAN for a 4G network. Core network 135 may include MME 310, SGW 320, vPGW 325, and vPCRF 330. Core network 130 may include a combined UDM+HSS 450, a SMF+PGW-C 455, a UPF+PGW-U 460, and a home PCF+PCRF 470.

Similar to FIG. 3, in the configuration of FIG. 4, DEA+PRA 305 may implement private roaming agent 160 as an extension to a DEA that has knowledge of the routing details to the private network 110. DEA+PRA 305 may route diameter signaling over S6a, S8-C, S8-U, and N24 interfaces between visited PLMN 115 and home network 110. Although shown within visited PLMN 115 in FIG. 4, in other implementations, MR 150 and/or DEA+PRA 305 may also reside outside visited PLMN 115.

Figure 5:
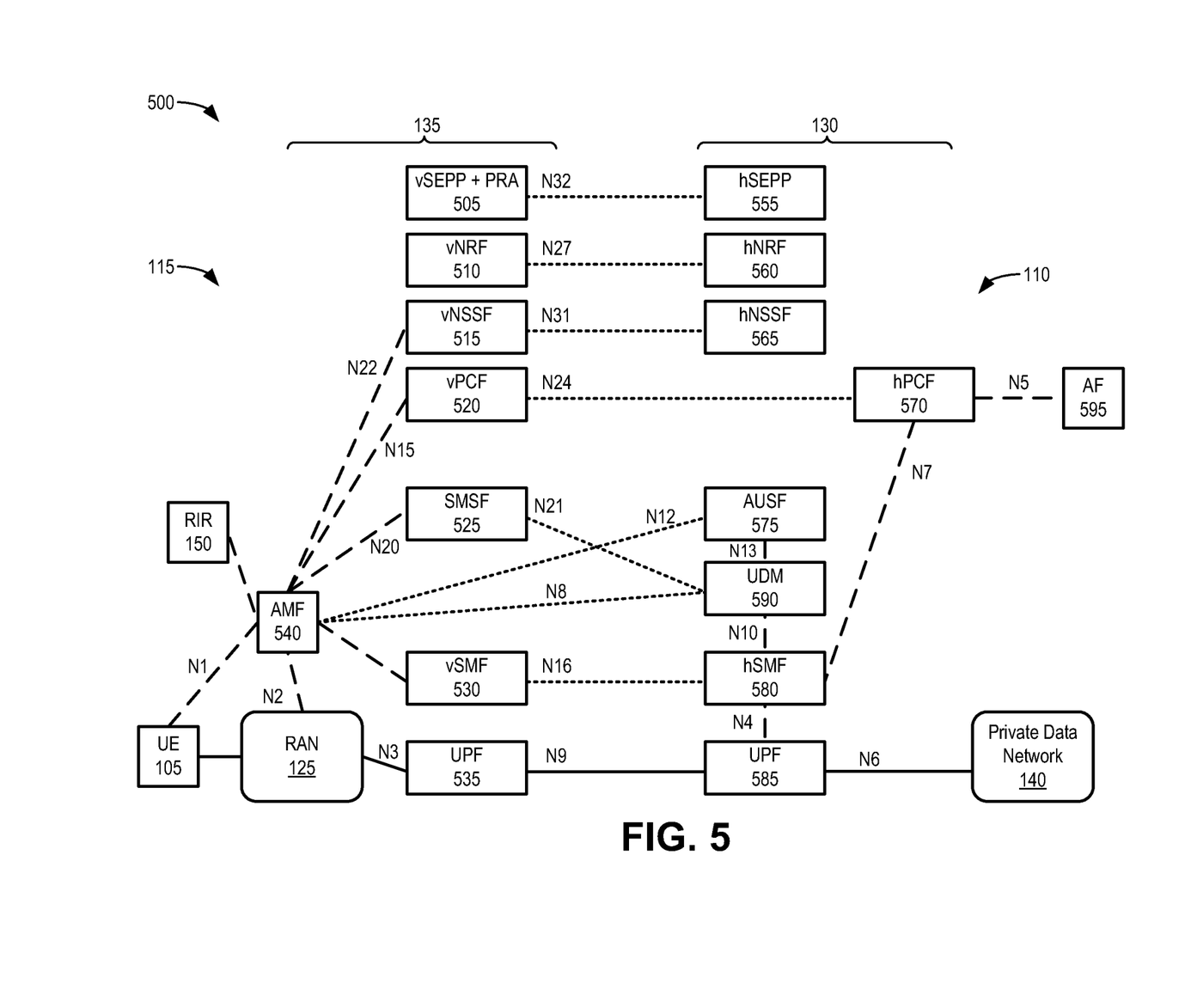
FIG. 5 is a diagram illustrating an embodiment of the roaming service for a 5G network environment, according to an implementation.

FIG. 5 is a diagram illustrating an embodiment of the private network roaming service for a 5G network environment 500, according to an implementation. As illustrated in FIG. 5, network environment 500 may include core network 130 and private data network 140 of private network 110, RAN 125 and core network 135 of visited PLMN 115, RIR 150, and combined visited SEPP+PRA (vSEPP+PRA) 505. In the configuration of FIG. 5, private network 110 and visited PLMN 115 may include 5G network components. RAN 125 may include a 5G NR RAN. Core network 135 may include vNRF 510, vNSSF 515, vPCF 520, vSMSF 525, vSMF 550, vUPF 535, and AMF 540. Core network 130 may include a home SEPP (hSEPP) 555, home NRF (hNRF) 560, home NSSF (hNSSF) 565, hPCF 570, AUSF 575, hSMF 580, UPF 585, and UDM 590. Network environment 500 may also include an application function (AF) 595 within our outside core network 130.

In the configuration of FIG. 5, vSEPP+PRA 505 may implement private roaming agent 160 as an extension to a visited SEPP that has knowledge of the routing details to the private network 110. Visited SEPP+PRA 505 may assist components of core network 135 to route signals (e.g., 5G SA-related HTTP2 signals) to the correct private core network based on prior provisioning. For example, vSEPP+PRA 505 may serve as a proxy function for logical roaming interfaces between visited PLMN 115 and home network 110. Thus, the logical roaming interface calls between visited PLMN 115 and home network 110 (e.g., N32, N27, N31, N24, N21, N12, N8, N16) may all be routed via vSEPP+PRA 505. Although shown within visited PLMN 115 in FIG. 5, in other implementations, RIR 150 and/or vSEPP+PRA 505 may reside outside visited PLMN 115.

Figure 6:
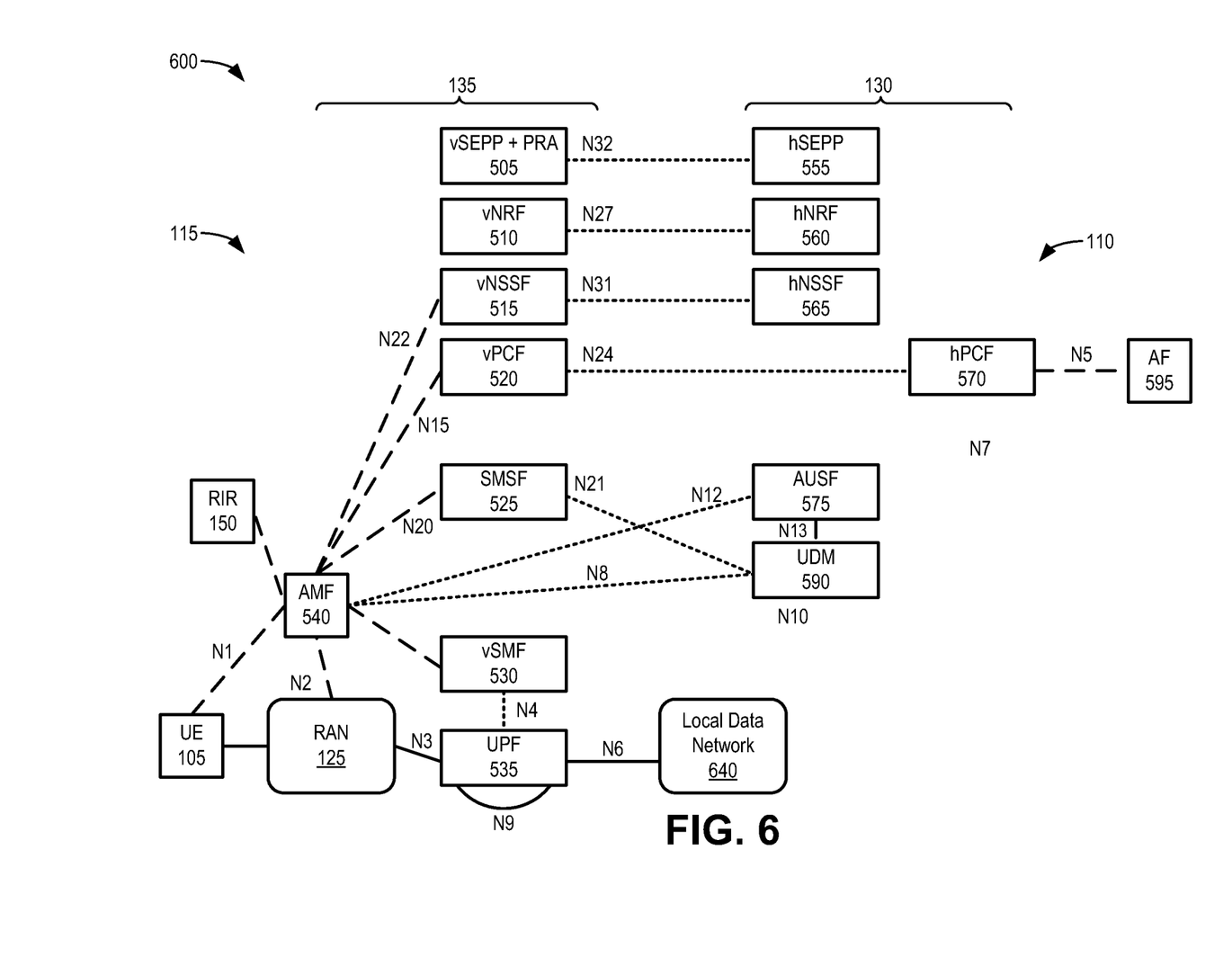
FIG. 6 is a diagram illustrating an embodiment of the roaming service for a 5G network environment using a local breakout (LBO) service, according to an implementation.

FIG. 6 is a diagram illustrating an embodiment of the roaming service for private network subscribers for a 5G network environment 600 using a local breakout (LBO) service, according to an implementation. As illustrated in FIG. 6, network environment 600 may include private core network 130, RAN 125 and core network 135 of visited PLMN 115, RIR 150, combined vSEPP+PRA 505, and a local data network 640. In the configuration of FIG. 6, private network 110 and visited PLMN 115 may include 5G network components. RAN 125 may include a 5G NR RAN. Core network 135 may include vNRF 510, vNSSF 515, vPCF 520, vSMSF 525, vSMF 550, vUPF 535, and AMF 540. Relevant portions of core network 130 may include a home SEPP (hSEPP) 555, home NRF (hNRF) 560, home NSSF (hNSSF) 565, hPCF 570, AUSF 575, and UDM 590. Network environment 600 may also include an application function (AF) 595 within our outside core network 130.

Network environment 600 implements a LBO architecture in which private network traffic "breaks out" of other traffic from UE device 105. LBO involves moving traffic from a core network to a local breakout network, such as a data network 640. A LBO provides access to the Internet, and/or other networks or to an MEC data center, at a LBO gateway (e.g., UPF 535) that is closer to the user and, thus, avoids transport of traffic through the core network (e.g., private core network 130). LBO, therefore, reduces a volume of traffic on the core network and may reduce end-to-end latency.

In the configuration of FIG. 6, vSEPP+PRA 505 may implement private roaming agent 160 as an extension to a visited SEPP that has knowledge of the routing details to the private network 110. Visited SEPP+PRA 505 may assist components of core network 135 to route signals (e.g., 5G SA-related HTTP2 signals) to the correct private core network based on prior provisioning. For example, vSEPP+PRA 505 may serve as a proxy function for logical roaming interfaces between visited PLMN 115 and home network 110. Thus, the logical roaming interfaces between visited PLMN 115 and home network 110 (e.g., N27, N31, N24, N21, N12, N8) may all be routed via vSEPP+PRA 505. Although shown within visited PLMN 115 in FIG. 5, in other implementations, RIR 150 and/or vSEPP+PRA 505 may reside outside visited PLMN 115.

Figure 7A:
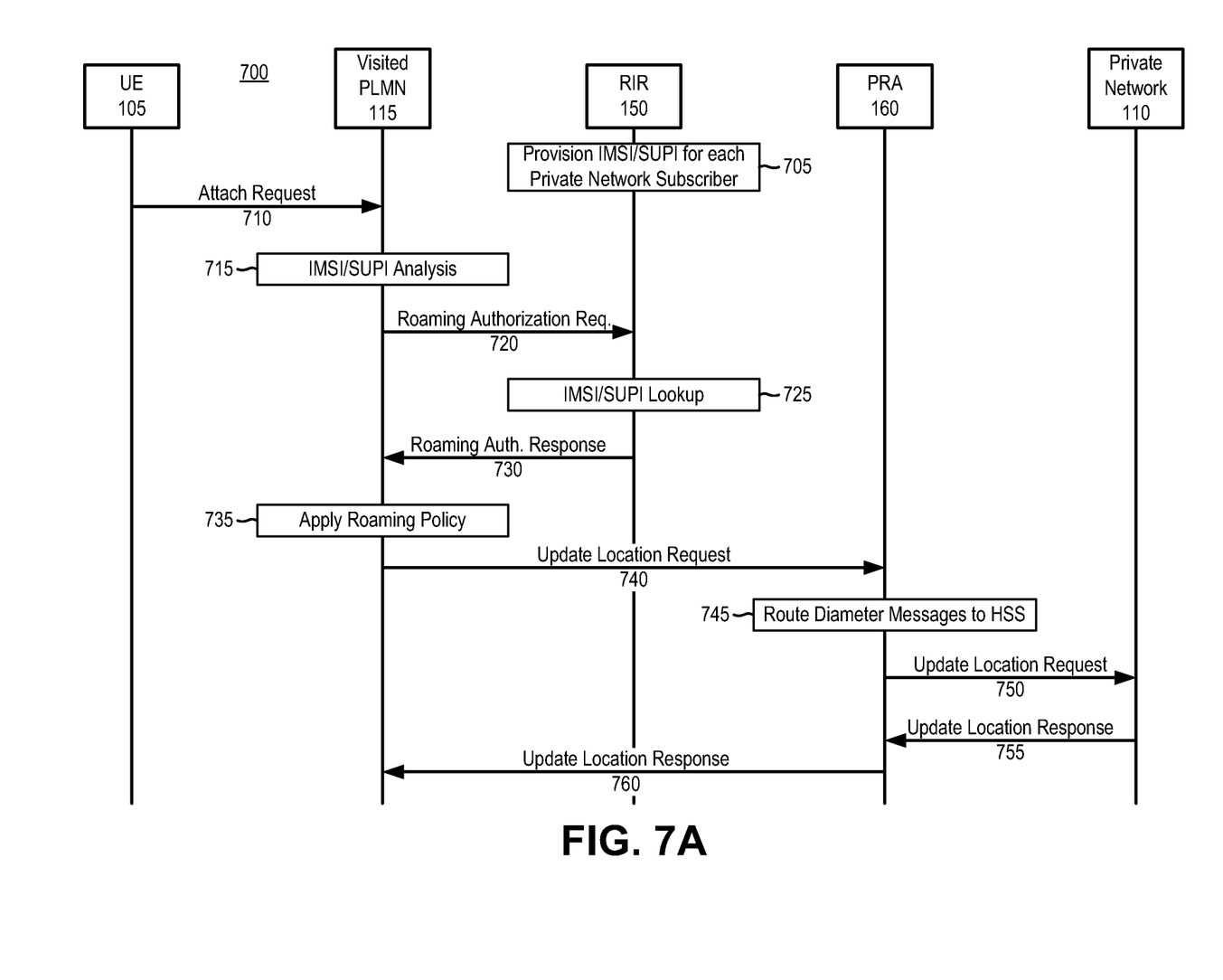
FIGS. 7A and 7B are a signal flow diagram illustrating communications to support the roaming service for private network subscribers, according to an implementation.
Figure 7B:
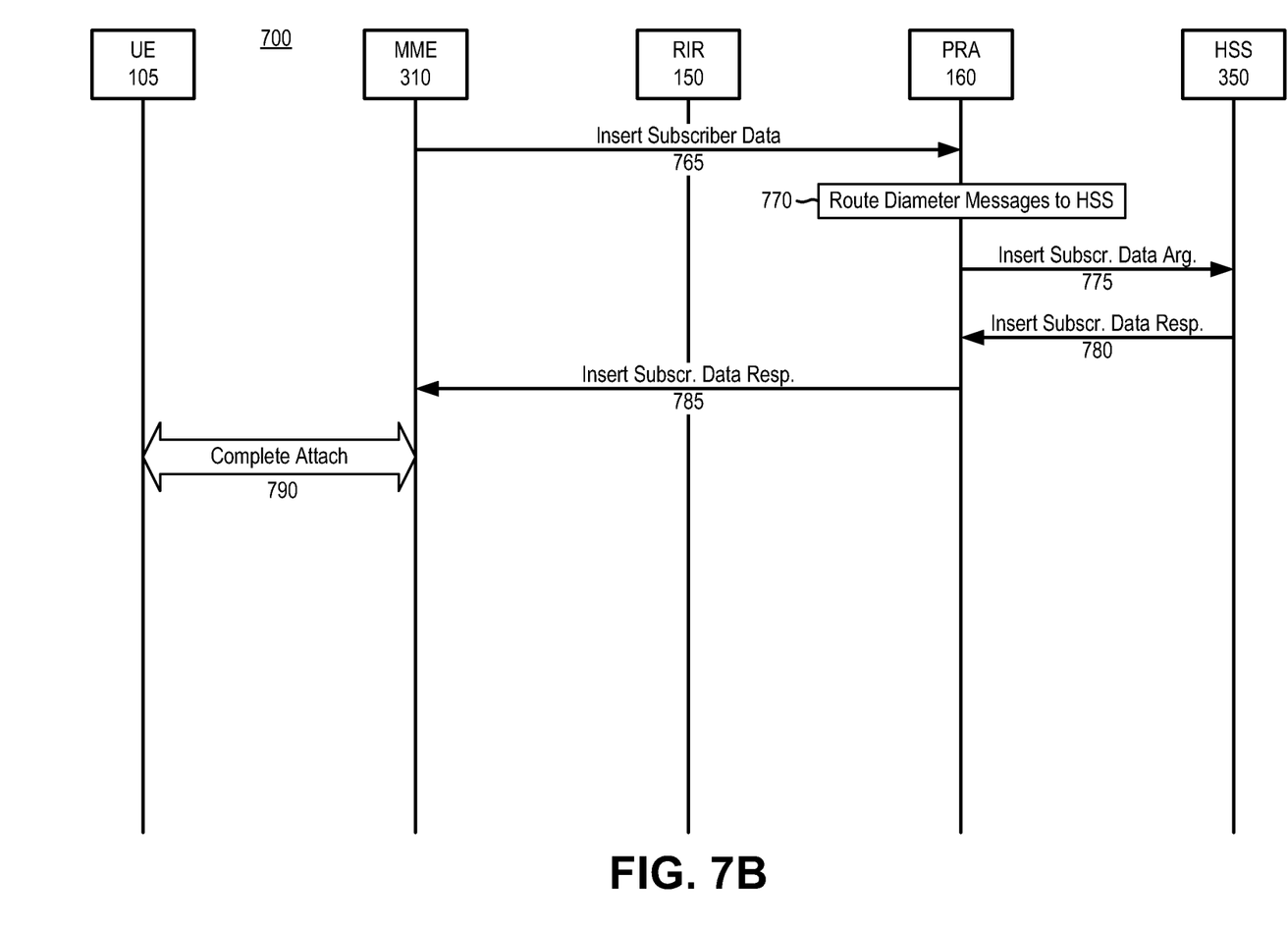

FIGS. 7A and 7B are a signal flow diagram illustrating communications to support the roaming service for private network subscribers in a portion 700 of network environment 100. More particularly, communications in FIGS. 7A and 7B illustrate inbound roaming of a UE from a private network, assisted by an RIR and PRA. Network portion 700 may include UE device 105, visited PLMN 115, RIR 150, PRA 160, and private network 110. According to one implementation, network portion 700 may correspond to a 4G/LTE network environment, where visited PLMN 115 signaling may be performed by MME 310, and private network 110 signaling may be performed by HSS 350. In another implementation, network portion 700 may correspond to a 5G network environment, where visited PLMN 115 signaling may be performed by AMF 540, and private network 110 signaling may be performed by UDM 590. FIGS. 7A-7B provide a simplified illustration of communications in network portion 700 and are not intended to reflect every signal, communication, or intermediate points for exchanges between functions/devices.

As shown in FIG. 7A, an IMSI/SUPI may be provisioned in RIR 150 for each private network subscriber (box 705). Provisioning may include adding to a registry/database an IMSI (or SUPI) and a unique Private Network Pointer (e.g., an address for HSS 350/UDM 590, etc.) to allow IMSI-based roaming policy and routing of Diameter/SA signaling to the correct network function in the correct private network (e.g., private network 110). In some implementations, provisioning may also permit multiple UEs 105 from the same private network 110 to be associated with a group policy. For example, provisioning may utilize an extended MNC (beyond 3 digits) from an IMSI to differentiate between private networks.

At some time after the provisioning, UE 105 (a subscriber of private network 110 roaming into coverage of visited PLMN 115) may send an attach request 710 to visited PLMN 115. For example, UE 105 may provide a Non-Access Stratum (NAS) attach request to MME 310 in visited PLMN 115. Attach request 710 may include an IMSI with a generic PLMN ID for private networks (e.g., a default "999-999" or "999-99" PLMN ID for private networks).

Visited PLMN 115 may receive attach request 710 and may perform an IMSI analysis (box 715) to determine that UE 105 is a private network user. For example, MME 310 may identify the MCC value of 999 in the PLMN ID of UE 105 and recognize a private network subscriber. Based on the IMSI analysis result, visited PLMN 115 (e.g., MME 310) may send a roaming authorization request message 720 to RIR 150. Roaming authorization request message 720 may include the IMSI of UE 105. In response to receiving roaming authorization request message 720, RIR 150 may perform an IMSI lookup (box 725). Assuming successful provisioning was performed at box 705, RIR 150 may perform a registry lookup, find the IMSI of UE 105, and identify the corresponding Private Network Pointer (e.g., a network address for HSS 350 in private network 110). RIR 150 may provide a roaming authorization response 730 to visited PLMN 115 (e.g., MME 310). Roaming authorization response 730 may indicate/confirm that RIR 150 found the IMSI for UE 105 and provide the Private Network Pointer.

Visited PLMN 115 may receive roaming authorization response 730 and apply a roaming policy based on the Private Network Pointer (box 735). The roaming policy may indicate, for example, that roaming by UE 105 is allowed and that all private network S6a signaling will be directed to a roaming gateway (e.g., PRA 160, which may be implemented in combined DEA+PRA 305). Using an S6a interface, visited PLMN 115 (e.g., MME 310) may send an update location request message 740 toward private network 110 (e.g., HSS 350) via PRA 160 to update/confirm the location of UE 105. Update location request 740 may request subscriber data from HSS 350 via a Diameter S6a interface and may include the Private Network Pointer (for HSS 350) and the IMSI (for UE 105).

PRA 160 may receive update location request 740 and identify the appropriate HSS (e.g., HSS 350 in private network 110) based on the Private Network Pointer (box 745). PRA 160 may forward 750 the update location request to HSS 350 in private network 110. Forwarded update location request 750 may include the IMSI of UE 105. Private network 110 (e.g., HSS 350) may then update the location associated with UE 105, transmit an update location response message 755 toward visited PLMN 115 (e.g., MME 310) via PRA 160. Update location response message 755 may include the IMSI and a confirmation, for example. PRA 160 may forward 760 the update location response to MME 310 in visited PLMN 115.

To request subscriber information, visited PLMN 115 (e.g., MME 310) may send a Diameter insert subscriber data argument message ("InsertSubscriberDataArg") 765 toward private network 110 (e.g., HSS 350) via PRA 160 using an S6a interface. InsertSubscriberDataArg 765 may include the Private Network Pointer for HSS 350 and IMSI for UE 105. PRA 160 may receive InsertSubscriberDataArg 765 and identify the appropriate HSS (e.g., HSS 350) based on the Private Network Pointer (box 770). PRA 160 may forward 775 the InsertSubscriberDataArg message to HSS 350 in private network 110. Forwarded InsertSubscriberDataArg message 775 may include the IMSI of UE 105.

In response to forwarded InsertSubscriberDataArg message 775, private network 110 (e.g., HSS 350) may identify types of services available to UE 105, and transmit an update services list in an Insert Subscriber Data Response message ("InsertSubscriberDataResp") 780 toward visited PLMN 115 (e.g., MME 310) via PRA 160. PRA 160 may forward 785 the InsertSubscriberDataResp message to MME 310 in visited PLMN 115. As shown at 790, MME visited PLMN 115 (e.g., MME 310) and UE 105 may then complete an EPS attachment process.

FIGS. 7A-7B depict signaling among network components primarily related to one interface (e.g., S6a) for illustration. Additional signaling for other interfaces (e.g., S8, S9, N32, N27, N31, N24, N21, N12, N8, N16, etc.) is not detailed as the number of roaming interfaces can be large. However, the same principles apply to each individual interface: PRA 160 helps in the routing of any signaling between the visited PLMN and the private network by linking the two networks based on information supplied by the RIR 150.

Figure 8:
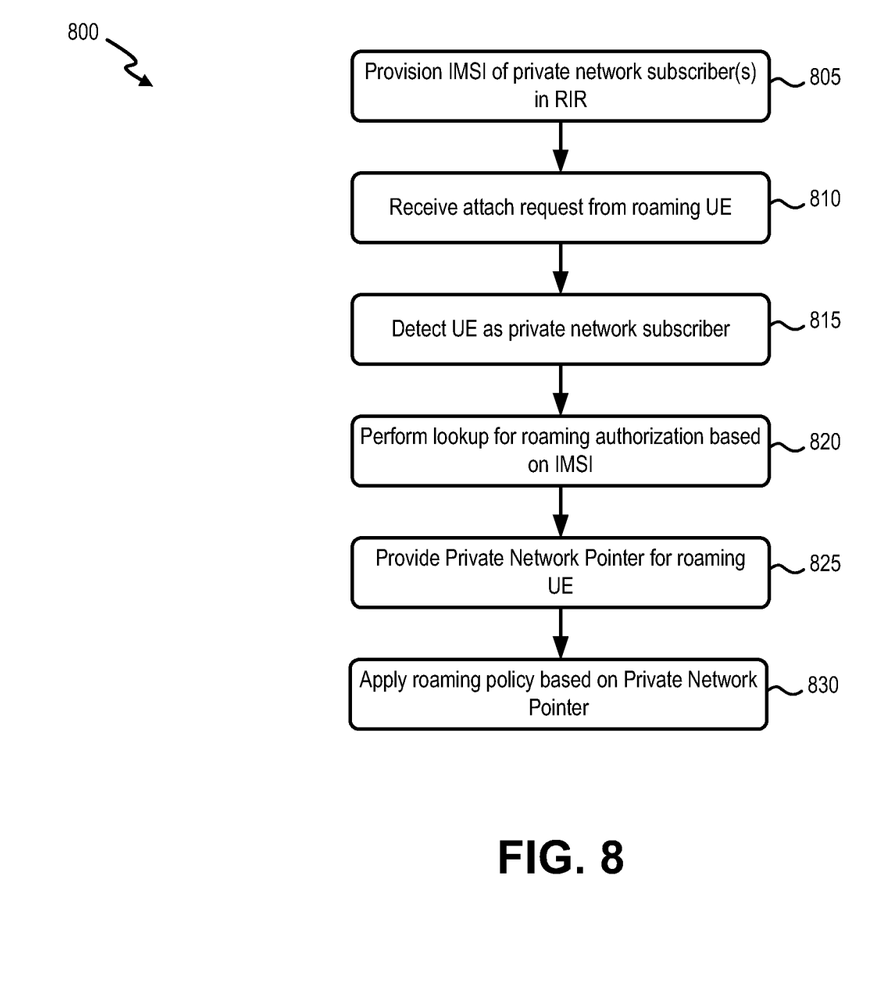
FIG. 8 is a flow diagram illustrating a process for providing a roaming service for private network subscribers, according to an implementation.

FIG. 8 is a flow diagram illustrating a process 800 for providing a roaming service for private network subscribers. In one implementation, process 800 may be implemented by devices in a visited PLMN, such as visited PLMN 115. In another implementation, process 800 may be implemented by devices in visited PLMN 115 in conjunction with one or more other devices in network environment 100.

Process 800 may include provisioning an IMSI of each private network subscriber in a roaming identity register (block 805). For example, RIR 150 may be provisioned, for example, as a result of a roaming agreement between private network 110 and public network 115. RIR 150 may store in a memory the IMSIs (or SUPIs) for each enabled private network subscriber (e.g., associated with a UE 105). In RIR 160, the IMSIs are mapped to Private Network Pointers that direct the private-network-bound signaling from the visited network to the appropriate network function (e.g., an HSS or UDM) in private network 110.

Process 800 may further include receiving an attach request from a roaming UE (block 810), detecting the UE as a private network subscriber (block 815), and performing a lookup for roaming authorization based on an IMSI of the UE (block 820). For example, after the provisioning, UE 105 may send an attach request 710 to visited PLMN 115. For example, UE 105 may provide a Non-Access Stratum (NAS) attach request to MME 310 or AMF 540 via RAN 125 in visited PLMN 115. The attach request may include an IMSI/SUPI with a PLMN ID of 999/999 (e.g., a default PLMN ID for private networks). MME 310/AMF 540 may receive the attach request and determine (e.g., based on the MCC value of 999 in the PLMN ID) that UE 105 is a private network user. MME 310/AMF 540 may send a roaming authorization request message 720 to RIR 150, causing RIR 150 to perform an IMSI lookup for UE 105.

Process 800 may also include providing a Private Network Pointer for the roaming UE (block 825). For example, based on the prior provisioning of RIR 150, and assuming the IMSI of UE 105 is registered in RIR 150, RIR 150 may match the IMSI of UE 105 to a corresponding Private Network Pointer (e.g., a network address for HSS 350/UDM 590 in private network 110). RIR 150 may provide the Private Network Pointer to the visited PLMN 115 (e.g., MME 310/AMF 540) via a roaming authorization response.

Process 800 may additionally include applying a roaming policy for the UE based on the Private Network Pointer (block 830. For example, the private network pointer may indicate a stored roaming policy (e.g., stored at visited PLMN 115) for UE 105 or private network 110. The roaming policy may indicate, for example, that roaming by UE 105 is allowed and that all private network S6a signaling will be directed to a roaming gateway. According to an implementation, a private roaming agent (e.g., PRA 160) may act as a proxy to assist signaling between the visited PLMN and private network.

Systems and methods described herein enable private telecommunications network subscribers that do not have a distinctive PLMN ID to access visited PLMN services. A device in a visited wireless network receives an attach request for a UE device; detects, based on the attach request, that the UE device is subscribed to a private network; provides, to a RIR, a roaming authorization request for the UE device; receives a roaming authorization response that includes a network pointer to the private network; and applies, based on the roaming authorization response, a roaming policy for the UE device. Thus, systems and methods described herein allows MVO's to offer users of private networks a fallback to the MVO's PLMN (or macro network) when private network services are not available.

The foregoing description of embodiments provides illustrations but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while series of blocks and signals have been described with regard to the processes illustrated in FIGS. 7A, 7B, and 8, the order of the blocks and/or signals may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 220, etc.), or a combination of hardware and software. The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 220) of a computational device. A non-transitory storage medium includes one or more of the storage mediums described in relation to memory 230.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:

receiving, at a first network component in a visited wireless network, an attach request for a user equipment (UE) device;

detecting, by the first network component and based on the attach request, that the UE device is subscribed to a private network, wherein, the detecting includes detecting, in a Public Land Mobile Network (PLMN) identifier (ID) for the UE device, a Mobile Country Code (MCC) designated for private networks;

providing, by the first network component and to a roaming identity register (RIR), a roaming authorization request for the UE device;

receiving, by the first network component, a roaming authorization response that includes a network pointer to the private network; and applying, by the first network component and based on the roaming authorization response, a roaming policy for the UE device.

2. The method of claim 1, wherein the network pointer includes a network address for one of:
- Unified Data Management (UDM) in the private network,
- a Home Subscriber Server (HSS) in the private network, or
- a combined UDM+HSS in the private network.

3. The method of claim 1, wherein the network pointer includes a network address for a second component in the private network.

4. The method of claim 1, further comprising:
- sending, via a private roaming agent (PRA) function, control plane signals to a second network component in the private network.

5. The method of claim 4, wherein the PRA function is included within one of:
- a Diameter Edge Agent (DEA), or
- a Security Edge Protection Proxy (SEPP).

6. The method of claim 1, wherein the RIR is included within the visited wireless network.

7. The method of claim 1, wherein the RIR stores in a memory an identifier for each UE device of multiple UE devices associated with different private networks.

8. The method of claim 7, wherein the RIR includes, in a memory, records to associate each identifier with one of multiple network pointers.

9. A device in a visited wireless network, comprising a processor configured to:
- receive an attach request for a user equipment (UE) device;
- detect, based on the attach request, that the UE device is subscribed to a private network, wherein, the detecting includes detecting, in a Public Land Mobile Network (PLMN) identifier (ID) for the UE device, a Mobile Country Code (MCC) designated for private networks;
- provide, to a roaming identity register (RIR), a roaming authorization request for the UE device;
- receive a roaming authorization response that includes a network pointer to the private network; and
- apply, based on the roaming authorization response, a roaming policy for the UE device.

10. The device of claim 9, wherein the network pointer includes:
- a unique string,
- a network address of a component in the private network,
- an application ID,
- a Destination-Realm, or
- a fully-qualified domain name (FQDN).

11. The device of claim 9, wherein the device includes a mobility management entity (MME) or an Access and Mobility Management Function (AMF).

12. The device of claim 9, wherein the roaming authorization request includes an International Mobile Subscriber Identity (IMSI) or Subscription Permanent Identifier (SUPI) of the UE device.

13. The device of claim 9, wherein the network pointer includes a network address for Unified Data Management (UDM) or a Home Subscriber Server (HSS) in the private network.

14. The device of claim 9, wherein the RIR is shared by multiple Public Land Mobile Networks (PLMNs).

15. The device of claim 9, wherein the network pointer includes a network address for a second component in the private network.

16. The device of claim 9, wherein the processor is further configured to:
- send, via a private roaming agent (PRA) function, control plane signals to a second network component in the private network.

17. A non-transitory computer-readable medium comprising processor-executable instructions that, wherein when executed by a processor, cause the processor to:
- receive, at a first network component in a visited wireless network, an attach request for a user equipment (UE) device;
- detect, by the first network component and based on the attach request, that the UE device is subscribed to a private network;
- provide, by the first network component and to a roaming identity register (RIR), a roaming authorization request for the UE device;
- receive, by the first network component, a roaming authorization response that includes a network pointer to the private network, wherein the network pointer includes a network address for a second component in the private network; and
- apply, by the first network component and based on the roaming authorization response, a roaming policy for the UE device.

18. The non-transitory computer-readable medium of claim 17, wherein the first network component includes a mobility management entity (MME) or an Access and Mobility Management Function (AMF).

19. The non-transitory computer-readable medium of claim 17, wherein the roaming authorization request includes an International Mobile Subscriber Identity (IMSI) or Subscription Permanent Identifier (SUPI) of the UE device.

20. The non-transitory computer-readable medium of claim 17, wherein the instructions to detect that the UE device is subscribed to the private network further cause the processor to:
- detect, in a Public Land Mobile Network (PLMN) identifier (ID) for the UE device, a Mobile Country Code (MCC) designated for private networks.

* * * * *